May 22, 1956
R. E. PARKS
2,746,642
DRINK DISPENSING DEVICE
Filed May 27, 1952
2 Sheets-Sheet 1
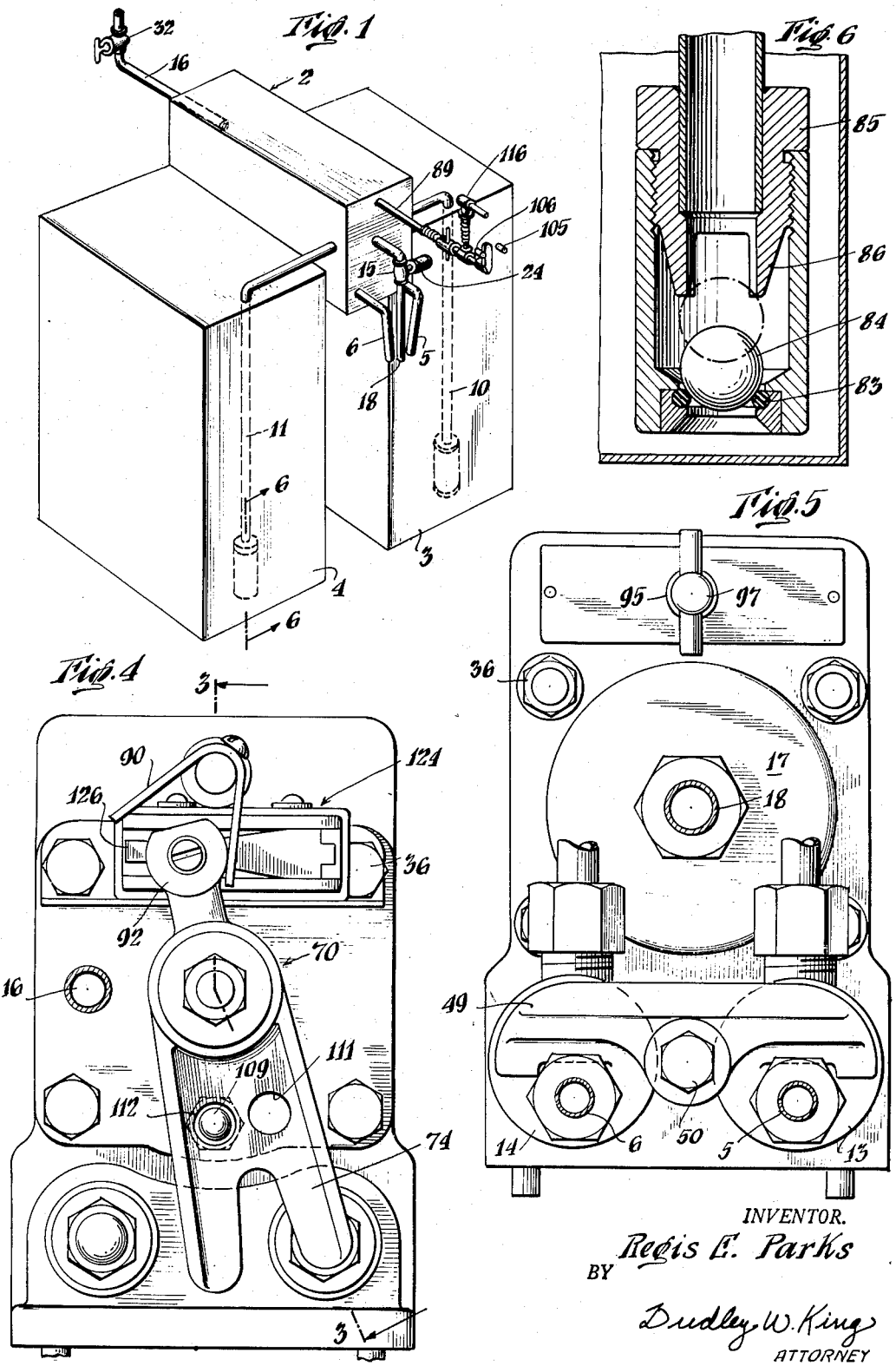
INVENTOR.
Regis E. Parks
BY
Dudley W. King
ATTORNEY

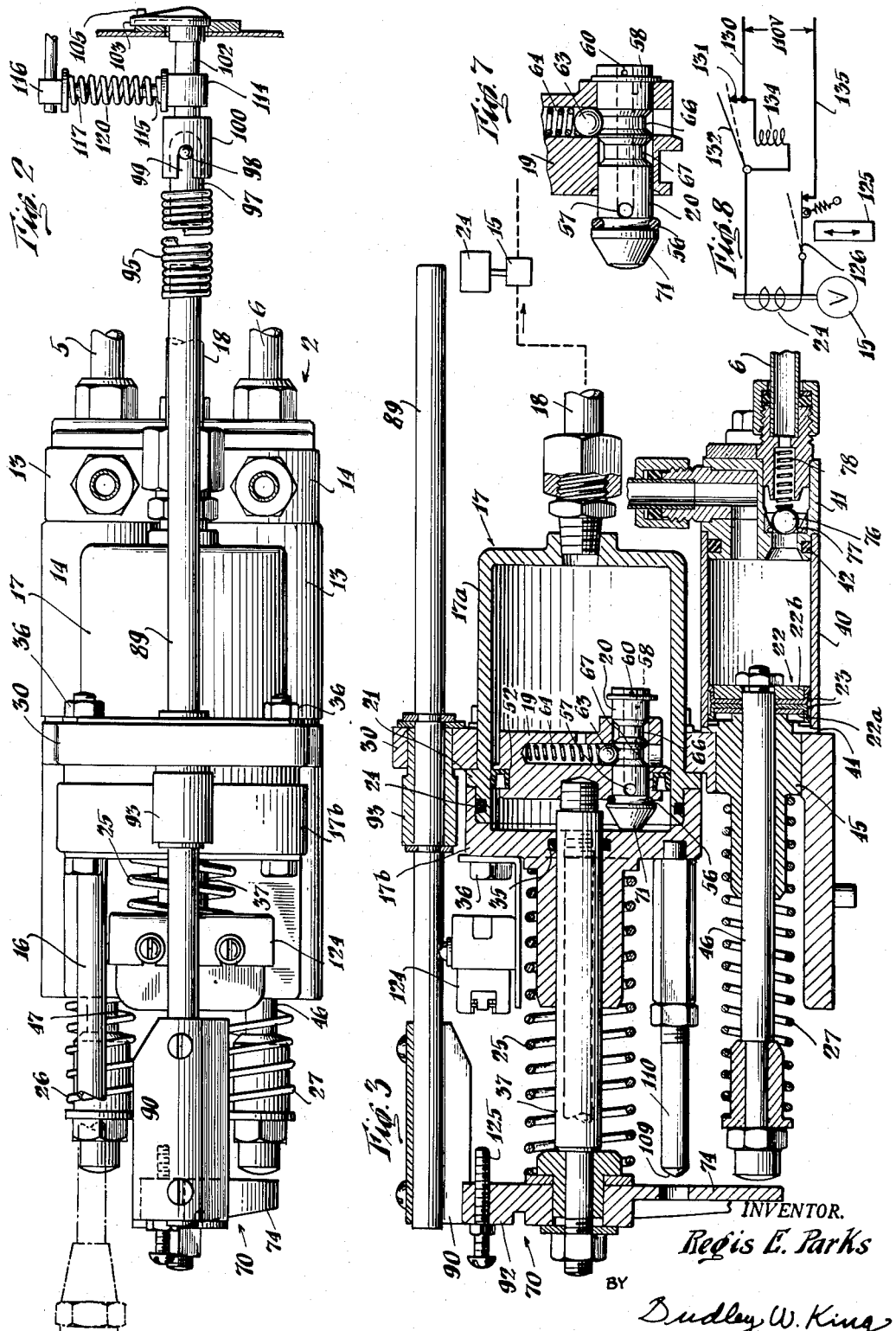

United States Patent Office 2,746,642
Patented May 22, 1956

2,746,642

DRINK DISPENSING DEVICE

Regis E. Parks, Fredonia, N. Y.

Application May 27, 1952, Serial No. 290,149

16 Claims. (Cl. 222—15)

The present invention relates to the automatic dispensing by vending machines of drinks comprising a plurality of different liquids, and more particularly to dispensing drinks which comprise water and some concentrated fruit juice such as grape juice, apple juice, etc.

In preparing drinks made from concentrated fruit juices it is desirable for best results that accurately measured quantities of the juice and water be delivered to a cup. The usual proportions are about one part concentrated juice and about three parts water. When the proportions are correct the resulting drink tastes as though freshly pressed from the fruit, but if the proportions are not correct the resulting drink does not taste right. The present invention aims to accurately and automatically measure out and deliver correct quantities of concentrated fruit juices and water.

An object of the present invention is to provide a new and improved device for dispensing drinks.

Another object of the invention is to provide an improved device for simultaneously dispensing a plurality of liquids that are to comprise a drink.

Another object of the invention is to provide an improved drink dispensing device of relatively simple construction and operation.

Another object of the invention is to provide an improved device for dispensing quantities of water and concentrated fruit juice.

Another object of the invention is to provide an improved drink dispensing device which is adapted to operate in response to pressure of water in a water supply conduit.

Another object of the invention is to provide a new and improved drink dispensing device which does not require clocks or other timing mechanisms for its operation.

Still another object is to provide an improved drink dispensing device which is adapted to furnish drinks of different flavors.

A further object of the invention is to provide an improved drink dispensing device which embodies means for selecting one of a plurality of available fruit juices.

A still further object of the invention is to provide a new and improved method of operating a drink dispensing device.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a schematic perspective view showing the present device in combination with a plurality of fruit juice containers;

Fig. 2 is a top plan view of the present device;

Fig. 3 is a sectional view of the present device taken along line 3—3 of Fig. 4;

Fig. 4 is an end of the device shown in Fig. 2;

Fig. 5 is a view showing the opposite end of the device illustrated in Fig. 4;

Fig. 6 is an enlarged sectional view taken along line 6—6 of Fig. 1;

Fig. 7 is a sectional view showing the piston valve of Fig. 3 in an open relationship; and Fig. 8 is a diagramatic representation showing an electric circuit which may be used with the present device.

Described generally the present invention comprises (Figs. 1 and 3) a dispensing device 2 adapted to be selectively set so as to draw concentrated fruit juices from one of a plurality of refrigerated containers 3 or 4 and deliver it to one of outlet conduits 5 or 6. One container may hold grape juice and the other apple juice. Concentrated juice is drawn through one of the inlet conduits 10 or 11 into one of a plurality of concentrate cylinders 13 or 14. Water for mixing with the juice is delivered through an inlet conduit 16 to the inlet side of a water cylinder 17. Pressure of water delivered to the water cylinder 17 is utilized to move a water cylinder piston 19 in one direction when a control valve 15 is open. The water piston 19 is operatively and selectively connected with a piston in one of the concentrate cylinders so that the concentrate pistons move in the same direction as the water piston, and water and fruit juice are simultaneously discharged from the respective cylinders. Each of the concentrate cylinders 13 and 14 contains a similiar piston and means is provided for selectively connecting these pistons with the water piston, so that a person may set the machine so as to obtain a desired flavor.

At the end of a dispensing stroke return springs 25 and 26 or 27 return the water piston and the actuated concentrate piston to an initial position. During this return stroke the previously emptied water and juice cylinders are resupplied with liquids to ready them for dispensing another drink.

A complete drink vending machine will include a suitable enclosing cabinet with means for delivering cups, means for receiving coins and making change, and means for refrigerating the liquids. Such items are not shown and described herein as they form no part of the present invention.

The construction and operation of the present device will now be described in detail.

As shown, the present device comprises a supporting bracket 30 carrying at its upper part the water cylinder 17. Fruit juice concentrate cylinders 13 and 14 are carried by the bracket 30 below the water cylinder. These cylinders are of such internal dimensions as to contain definite volumes of water and juices, the effective volume of the water cylinder being preferably about three times that of either concentrate cylinder.

As brought out hereinabove, movement of the water piston 19 is utilized to deliver a charge of water and also to move a concentrate piston connected therewith. Water is delivered to the water cylinder through inlet conduit 16 and is forced out of that cylinder through outlet conduit 18. Water pressure is utilized to move the water piston toward the right end of its cylinder, as shown in Figs. 2 and 3. Water which enters this cylinder is intermittently transferred, as will be hereinafter brought out, to the outlet side of the water piston through movable valve means 20 carried by the piston. The details of this valve and its operation will be hereinafter described. A pressure regulator 32 may be provided in the water inlet conduit 16 to insure uniform pressure, usually about twenty pounds per square inch, at the inlet side of the water piston 19.

The water and concentrate cylinders may be constructed in any suitable manner. As shown, the water cylinder comprises a bell-like right hand portion 17a extending into an end cap portion 17b. The bell-like portion 17a has a groove extending therearound which carries a gasket 34 of neoprene rubber and other suitable material for forming a seal with the adjacent inwardly disposed wall portion of the end cap member 17b. The end cap carries an annular gasket 35 for forming a seal against the piston rod 37 which connects with the piston 19 and projects out of the cylinder through an elongated bearing portion of the end cap 17b. The bell-shaped portion and end cap of the water cylinder 17 may be held in assembled relationship on the bracket 30 by bolts 36 which extend through openings in flange portions of these members, and which pull the end member 17b up against a projecting flange 21 and the latter up against the bracket member 30.

The outlet conduit 18 from the water cylinder 17 has a valve 15 therein operated by a solenoid 24. When the solenoid allows the valve to close water can not flow out of the water cylinder and the water piston 19 remains at rest adjacent the left end of the water cylinder. When the valve 15 is opened by the solenoid the conduit 18 is opened to atmospheric pressure and water pressure at the inlet side of the water piston moves the piston toward the right to force water from the cylinder 17 through the outlet conduit 18. The conduit 18 terminates at a position where a cup may readily be inserted under it. A suitable gasket 52 around the periphery of the water piston minimizes passage of water between the cylinder wall and the piston.

The normal "at rest" or initial position of the water piston 19 is at the left end of the cylinder 17. When a coin is dropped into an appropriate slot of the machine an electric circuit is established which operates the solenoid 24 so as to open the valve 15.

During movement of the water piston 19 to the right and discharge of water through the outlet conduit 18, the rod-like valve member 20 carried by the water piston is in closed position so that the entire pressure of water at the inlet side of the water piston is exerted against the piston. As the piston moves toward the wall at the right end of the cylinder, the right end of the valve 20 approaches to finally contact this end wall; as the water piston continues movement subsequent to this contact the valve 20 is pushed toward the left so that an annular sealing gasket 56 moves away from the inlet side of the water piston and laterally extending openings 57 are projected beyond the inlet side of the water piston. The lateral openings 56 communicate with a longitudinal extending opening 58 in the valve and hence water may pass through the openings 57 and 58 from the inlet side of the water piston to the outlet side thereof. Since the right end of the valve 20 is up against the end wall of the piston 17 in this relationship there is preferably provided a small lateral exit opening 60, about 1/32 inch diameter, extending from the valve opening 58 to the exterior thereof; water may initially pass through this small opening from the interior of the valve to the surrounding cylinder space.

A retaining ball 63 and spring 64 are provided to hold the valve 20 in either the closed position (Fig. 3) or the open position in which the groove 66 moves into registry with the ball rather than the groove 67.

When the piston valve 20 is moved to open position, water may pass through the valve from the inlet side of the piston to the outlet side thereof, for subsequent ejection through the outlet conduit 18.

Shortly after the piston valve 20 is moved to open position the circuit to the solenoid 24 is interrupted and the solenoid causes the valve 15 to close. In this condition no more water can pass out of the cylinder 17 through the outlet conduit 18 and the water pressure at opposite sides of the water piston 19 is substantially the same. At this point in the operation a return spring 25 around the water piston rod 37 has been compressed between the end of the cylinder 17 and an arm 70 which projects laterally from the rod. The spring now forces the water piston 19 and its rod to the left and water passes from the inlet side of the water piston 19 through the valve 20 to the outlet side of the piston.

As the piston 19 approaches the left end of its cylinder 17 the opposite end 71 of the piston 20 comes into contact with an end wall of the cylinder. Continued movement of the water piston forces the valve 20 to the right and moves the laterally extending valve opening 57 inside the piston and the sealing gasket 56 into contact with the sealing surfaces of the piston. The retaining ball and spring (63, 64) snap out of the "open" recess 66 into the "closed" recess 67 and hold the sealing gasket 56 firmly against adjacent surfaces of the piston 19. Water is now blocked against flowing from the inlet to the outlet side of the piston 19. The water cylinder is now full of water at the outlet side of its piston and is in readiness for another cycle.

As brought out in the general description, concentrated fruit juice is delivered from one of the plurality of similar concentrate cylinders simultaneously with delivery of water from the water cylinder 17. Two concentrate cylinders 13 and 14 are shown mounted adjacent the lower part of the bracket 30, but any suitable number may be used.

Each concentrate cylinder may comprise a tubular portion 40 having an end member 41 fitted thereinto. The end member 41 carries a gasket 42 for forming a seal against an inner wall of the tubular member 40 and has suitable connections for the inlet conduits 10 or 11 and the discharge conduits 5 or 6, as the case may be. The opposite end of each concentrate cylinder may comprise an end member 45 having an elongated bearing portion projecting therefrom for guiding a piston rod 46. A slot 44 at the bottom of the end member 45 communicates with the atmosphere, to thus prevent formation of vacuum at the left side of a piston during a delivery stroke and to allow escape of liquid that may get to the left of the piston.

The concentrate piston 22 is shown comprising a pair of discs 22a and 22b clamped against opposite faces of intermediate rubber or neoprene members 23. The concentrate cylinder assemblies may be held in assembled relationship with the bracket 30 by a yoke 49 which projects over the outer ends of the end members 41 and by a bolt 50 which extends through the yoke 49 and is threaded into a portion of the bracket 30.

Delivery of concentrate is obtained by selectively connecting one of the concentrate piston rods with the water piston rod 37. This selective connection may be obtained (Figs. 2–4) by swinging an arm 70 into or out of alignment with either one of the projecting rods 46, 47 of the concentrate cylinders. As the water piston and its rod move to the right the downwardly projecting portion 74 of the selector arm 70 contacts one of the concentrate piston rods and pushes that rod and its piston toward the right to force concentrated fruit juice through an outlet conduit. If the depending portion 74 of the selector arm is aligned with the concentrate rod 46, concentrate will be forced out through the discharge conduit 6 and if the selector arm is aligned with the other concentrate piston rod 47 juice will be forced out through the discharge conduit 5.

Check valves are provided (Figs. 3 and 6) to close the outlet conduits 5 and 6 during movement of the concentrate pistons toward an initial position. Each of these check valves may comprise a ball 76 urged toward the seal on an annular neoprene rubber ring 77 by a spring 78. The ball 76 unseats due to liquid pressure when the piston 22 moves to the right and on movement of the piston toward the left the spring 78 firmly seats the ball and the latter closes off the concentrate outlet conduits 5 or 6, as the case may be.

As a concentrate piston returns to its initial position under the influence of a return spring 27 it creates a partial vacuum in the concentrate inlet (10 or 11) connected with the concentrate cylinder. This draws a fresh charge of concentrate from a concentrate container (3 or 4) and fills the particular concentrate cylinder. Each inlet conduit 10 and 11 is provided with a similar check valve (Fig. 6) which permits drawing concentrated juice from the particular container but which prevents egress of liquid through the inlet conduits during a delivery stroke of a concentrate piston. A suitable check valve for this purpose comprises (Fig. 6) a gasket ring 83 and sealing ball 84. During a delivery stroke the ball 84 seats against the ring 83 due to gravity and also due to liquid pressure. During a return stroke the partial vacuum created in the concentrate cylinder lifts the ball 84 off its seat so that juice may pass around the ball through the inlet conduit. A collar member 85 with projecting fingers 86 prevents the ball from blocking the inlet conduit during the return stroke of a concentrate piston.

Movement of the selector arm 70 so as to register with either of the concentrate piston rods 46, 47 is obtained by rotating the arm 70. The depending portion 74 of the selector arm may be swung into alignment with one or the other of the concentrate rods. The selector arm 70 may be rotated by a selector shaft 89 and shifter member 90 secured thereto. The shifter member extends downwardly from the shaft 89 at opposite sides of an upwardly extending projection 92 of the selector arm 70. When the selector shaft 89 is turned so as to rotate it in supporting bearing 93 a depending surface of the shifter member contacts the selector arm projection and rotates the arm 70 in one direction; rotating the selector shaft in an opposite direction swings the arm 70 in an opposite direction and causes its lower end to move into alignment with the piston rod of the other concentrate cylinder. The shifter member 90 may be of any suitable length, but is preferably such as to project downwardly beyond the upper portion 92 to the arm 70 throughout its travel to and fro with the water piston rod 37.

The selector shaft 89 preferably has a torsion spring 95 secured thereto and the latter connects with a short rod 97 from which a pin 98 projects laterally. The pin fits into a slot 99 of a yoke member 100 and the yoke has an outwardly extending portion 102 provided with a handle 103. As the handle 103 is rotated it turns the extension 102, yoke 100, rod 97, spring 95 and selector shaft 89. A pair of angularly spaced stops 105, 106 are provided for cooperating with the handle 103 to limit the extent of rotation of the selector shaft 89. The stops 105 and 106 prevent a person from turning the selector shaft so far as to move the selector arm 70 beyond a position of alignment with one of the concentrate piston rods 46, 47.

The torsion spring 95 permits a person to turn the selector handle 103 during an operating cycle of the machine. That is, a retaining and guide pin 110 holds the arm 70 against rotation and "flavor switching" during an operating stroke but a person may swing the selector shaft 89 and shifter member 90 while the machine is operating without danger of damaging any of the parts. For example, if the device is delivering concentrate from one cylinder, the selector shaft and shifter member may be turned to the indicated position for a different flavor drink, so that the shifter member presses against the upper part 92 of the selector arm; when the concentrate piston and water piston have returned to an initial position, the shifter member automatically swings the selector arm 70 over to a position in which its lower portion 74 aligns with the other concentrate piston rod. In addition, the torsion spring 95 provides a flexible connection which facilitates alignment of the operating handle 103 and yoke 100 with the selector shaft 89; this feature is desirable as the yoke and its extension 103 are generally carried by and extend through a door at the front of a cabinet which encloses the present device.

In order to prevent damaging any of the operating parts means is provided for preventing movement of the selector arm 70 if the device has commenced an operating cycle. As shown in Figs. 3 and 4 this means comprises a guide pin 110 adapted to project through either of the openings 111 or 112 in the operating arm 70. The guide pin is secured adjacent one end thereof to some suitable portion such as the water cylinder 17. The outer end 109 of the guide pin terminates closely adjacent the selector arm 70. When the selector arm is swung so as to align with either of the concentrate piston rods 46, 47 an appropriate selector arm opening 111, 112, aligns with the guide pin 110. As the arm 70 moves toward the particular concentrate piston rod with which it is aligned, the outermost end 109 of the guide pin enters one of the selector arm openings 111, 112 to hold the latter against rotation.

As described above selector shaft 89 is rotated to move arm 70 into contact with either piston rod 46 or 47. A spring means is provided to force the handle 103 on selector shaft 89 against either stop 105 or 106 (Fig. 1) depending upon the direction that the handle is turned. This insures accurate alignment of the arm 70 so that either hole 111 or 112 will engage guide pin 110 as piston rod 37 moves to the right (Fig. 1).

This spring means comprises a spring 120 compressed between collars 114 and 116. Collar 114 is rigidly fixed to yoke extension 102 and has a projecting pin 115 to engage spring 120. Collar 116 is rigidly mounted on a fixed shaft fastened in any suitable manner (not shown) to a stationary portion of the device. Spring 120 is aligned with handle 103 when it is midway between stops 105 and 106 (Figs. 1 and 2) so that the force of spring 120 is directed through the axis of yoke extension 102 and does not tend to rotate the yoke extension 102. When handle 103 is turned toward stop 105 or 106 the lower end of spring 120 is moved by pin 115 and the spring force no longer passing through the axis of the yoke extension acts to turn and to hold handle 103 firmly against the stops. As the yoke connects with the selector shaft 89 through pin 98 it similarly urges the shaft 89 and shifter member 90 "off center" and swings the arm 70 into alignment with one or the other of the concentrate piston rods.

Closing of the valve 15 in the water cylinder outlet conduit 18 is obtained by a micro-switch 124 which is operated in response to movement of the water piston 19. The piston rod 37 of the water piston 19 moves the portion 92 of the selector arm toward the micro-switch 124 during a discharge stroke and an adjustable screw 125 carried by the selector arm contacts arm 126 of the micro-switch to interrupt the electric circuit and actuate the solenoid. This causes the solenoid to operate the outlet valve 15 and close the conduit 18. Actuation of the micro-switch 124 occurs shortly prior to movement of the water piston valve 20 from its closed to open position. The screw 125 which actuates the micro-switch 124 is adjustable so that the instant of its contact with the micro-switch arm 126 may be finely adjusted.

Any suitable electrical hookup may be utilized. That shown in Fig. 8 is much simplified and is intended to illustrate the features in a general way. As shown a power line 130 has a contact 131 adapted to be closed by a switch 132. This switch is coin-controlled and is normally in open position. When a coin is dropped into the machine the switch 132 closes the contact 131; any suitable relay 134 may be provided for holding the switch 132 closed. In closed position of the switch 132 current may pass through the solenoid 24 to effect closing of the valve 15, current passing out through the micro-switch arm 126 and return line 135. The micro-switch arm 126 may be normally held in closed position. When the selector arm 70 moves the threaded actuating member 125 during a water ejection stroke, the end of the threaded member 125 contacts the micro-switch 126 and breaks the circuit. This circuit break may be utilized to release the switch 132. In this relationship the valve 15 may close so as to shut off the water outlet conduit 18.

The particular ratios of water and concentrated fruit juice are shown "built-in" to the machine, but it will be understood that means may readily be provided for adjusting the ratios; for example, the strokes of the pistons could be varied in any suitable manner.

It will be seen that the present invention provides a new and improved device for making drinks. No clocks or other timing mechanisms are required to control the operation of the device and no electric or other motors are required to operate it. The device operates in a highly efficient and satisfactory manner by water pressure and the same water which is used for operating pressure is utilized in forming a drink comprising water and fruit juice. Simple and efficient means is provided for selecting the particular drink flavor desired.

The concentrate cylinders are replenished with fresh charges of juice during a return stroke and no pumps or pressure means are required for this replenishing. The water cylinder is automatically provided with a fresh charge of water during the return stroke and this piston and this water charge is sealed off for ejection with the chosen fruit juice upon a succeeding ejection stroke.

The selector mechanism is of simple construction and means is provided for preventing the possibility of inadvertently changing flavors once an operating stroke has commenced; this feature is highly desirable as it prevents inadvertently damaging or destroying operating portions of the device. The present device is of relatively simple and inexpensive construction and is operable over extended periods of time with minimum maintenance.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a drink dispensing device, the combination of a plurality of cylinders each adapted to contain a liquid, a piston in each cylinder, means for selectively interconnecting a plurality of said pistons so that movement of one moves another, an inlet conduit connected with one of said cylinders adapted to supply liquid under pressure to one side of its piston, an outlet conduit connected with said cylinder at an opposite side of said piston, means for opening the outlet conduit to thereby effect movement of the piston toward the outlet conduit under the influence of liquid pressure in said inlet conduit, and conduits connected with the other of said cylinders for conducting liquid thereto and therefrom.

2. A device as claimed in claim 1, in which said means in the outlet conduit comprises a valve, and a solenoid is operatively connected with said valve for actuating it.

3. In a drink dispensing device, the combination of a plurality of cylinders each adapted to contain a liquid, a piston in each cylinder having a piston rod projecting therefrom, means for selectively interconnecting a plurality of said piston rods so that movement of one piston moves another, an inlet conduit connected with one of said cylinders adapted to supply liquid under pressure to one side of its piston, an outlet conduit connected with said cylinder at an opposite side of said piston, a valve for opening the outlet conduit to thereby effect movement of the piston toward the outlet conduit under the influence of liquid pressure in said inlet conduit, a solenoid for actuating said valve, means for closing said valve in response to movement of one of said pistons to thereby stop movement of said piston, and conduits connected with the other of said cylinders for conducting liquid thereto and therefrom.

4. A device as claimed in claim 3, in which said means for closing the valve includes an electric switch and a member movable with one of the pistons to contact said switch and actuate the solenoid so as to close the valve.

5. A device of the class described comprising a plurality of cylinders, a piston in each said cylinders having a rod projecting therefrom, means for selectively interconnecting a plurality of said rods to cause their pistons to move together, one of said pistons having an opening therethrough, and movable valve means carried by said piston having portions projecting beyond opposite faces of said piston adapted to contact opposite end walls of said cylinder and move the valve and close said opening when the piston is moved adjacent one end wall and to move the valve and open said opening when the piston is moved adjacent to the opposite end wall.

6. A drink dispensing device comprising the combination of a first cylinder having a piston therein and a piston rod projecting therefrom, a plurality of additional cylinders each having a piston therein and a piston rod projecting therefrom, and means for selectively connecting said first rod with said second rods to thereby effect movement of a connected additional rod and piston upon movement of the piston and rod of said first cylinder.

7. A device of the class described comprising a cylinder having a piston therein and a rod projecting therefrom, a plurality of additional cylinders each having a piston therein and a rod projecting therefrom, an arm carried by said first cylinder rod and projecting therefrom, and means for moving said arm to operatively and selectively engage with a rod of one of said additional cylinders.

8. A device as claimed in claim 7, in which there is provided means for retaining said arm in its selected position.

9. A device of the class described comprising a cylinder having a piston therein and a rod projecting therefrom, a plurality of additional cylinders each having a piston therein and a rod projecting therefrom, an arm carried by the first cylinder rod and projecting therefrom, means for moving said arm to operatively and selectively engage with a rod of one of said additional cylinders, said arm having a plurality of apertures therein, and a pin member adapted to extend into one of said apertures at a time to thereby retain said member in a selected position.

10. A device of the class described comprising a water cylinder having a piston therein and a rod projecting therefrom, a plurality of concentrate cylinders each having a piston therein and a rod projecting therefrom, an arm carried by said water cylinder rod and projecting therefrom, and means for moving said arm to operatively and selectively engage with one of said concentrate cylinder rods, said means including a spring adapted to provide a flexible coupling.

11. A device of the class described comprising a water cylinder, a plurality of concentrate cylinders adjacent said water cylinder, a piston in each cylinder having a piston rod connected therewith and projecting beyond the cylinder, an arm carried by the water cylinder piston rod and projecting laterally therefrom to a position adjacent the piston rods of the concentrate cylinders, and means for rotating said arm to operatively and selectively engage with said concentrate cylinder piston rods and move the piston of an engaged rod simultaneously with the piston and rod of said water cylinder.

12. A device as claimed in claim 11 in which a spring encircles each rod and said springs are adapted to return the rods to an initial position upon the completion of a dispensing stroke.

13. A device of the class described comprising a cylinder, an inlet in one end of said cylinder, an outlet in the opposite end of said cylinder, a piston with a projecting rod mounted in said cylinder, a force means connected to said rod urging said piston towards said inlet, a valve in said piston adapted to be opened by contact with the outlet end of said cylinder and to be closed by contact with the inlet end of said cylinder, said inlet adapted for connection to a source of fluid under pressure, said outlet connected through a valve to the surrounding atmosphere, a remote control means actuated by a sensing device when said piston is adjacent the outlet end of said cylinder to close the outlet valve whereby said piston is moved toward the output end of said cylinder by the fluid under pressure when said piston valve is closed and the outlet valve is open and whereby said piston is moved toward the inlet end of said cylinder after reaching the outlet end when the piston valve is opened and the outlet valve is closed.

14. The device as claimed in claim 13 in which a second cylinder has a piston operatively connected with the projecting rod to move with said first piston.

15. The device as claimed in claim 13 in which a plurality of additional cylinders have pistons selectively connectable with said projecting rod of the first cylinder whereby one or more of the pistons of said additional cylinders is moved with the piston of the first cylinder.

16. The device as claimed in claim 15 in which said additional cylinders are provided with inlet and outlet conduits, said inlet conduits having a check valve for preventing egress of liquid therefrom, and said outlet conduit having a check valve for preventing flow of liquid therethrough into said cylinders.

References Cited in the file of this patent
UNITED STATES PATENTS

| | | |
|---|---|---|
| 728,651 | Albright | May 19, 1902 |
| 1,380,771 | Cartwright | June 7, 1921 |
| 1,481,134 | Hampton | Jan. 15, 1924 |
| 1,932,976 | Lamb et al. | Oct. 31, 1933 |
| 1,947,383 | Dayton | Feb. 13, 1934 |
| 2,503,376 | Burgess | Apr. 11, 1950 |
| 2,525,295 | Harrington | Oct. 15, 1950 |
| 2,536,400 | Thompson | Jan. 2, 1951 |
| 2,538,111 | Luster | Jan. 16, 1951 |
| 2,588,217 | De Mille | Mar. 4, 1952 |